Patented Apr. 24, 1934

1,956,362

UNITED STATES PATENT OFFICE 1,956,362

METHOD OF PREPARING FOOD FLAVORS, EXTRACTS AND JUICES

John B. Rolle, Chicago, Ill., assignor to Garoni Products Company, Chicago, Ill., a corporation of Illinois No Drawing. Application August 19, 1929, Serial No. 387,085

5 Claims. (Cl. 99—11)

The invention relates to food flavors, extracts and juices and the method of preparing the same.

More particularly the invention relates to the securing of flavors, extracts and juices from vegetables and especially from garlic and onions. The various steps taken and quantities of ingredients used in connection with the handling of the garlic and onions in order to secure the flavors, extracts and juices from the respective vegetables are somewhat similar and their differences will be hereinafter pointed out.

With reference to the garlic flavor and extract, it is an object of the invention to secure such a product or relish that will distribute itself in the food products with which it is used, more evenly and more quickly than is the case with the distribution of the flavor or extract made by any of the methods in general practice at the present time.

The garlic flavor and extract may be used for improving the taste of salads, roasts, steaks, chops, poultry, soups, fish and many other food products.

One of the principal objects of the invention with reference to the obtaining of garlic flavor, extract and juice is to secure a uniform quality and strength so that the manufacturer who uses the garlic flavor, extract or juice in his food products may be assured that the food products will have the proper zest and taste, and will be palatable at all times.

One of the difficulties which have been met with in connection with the manufacture of garlic flavor, extract and juice, is that raw garlic varies as to the varieties grown and as to the places in which it is grown. As an example, the garlic grown in Mexico has much greater flavoring qualities than that grown in some parts of the United States. The fact that garlic grown in various localities has varying strength is one of the major difficulties in connection with the manufacture of the garlic flavor, extract and juice, and is a reason for the variations in the products made by various manufacturers, which difficulties are obviated and overcome by the practice of the present invention.

The average composition of garlic is shown by the following table:

| | |
|---|---|
| Water | 64.6 |
| Protein | 6.8 |
| Fat | 0.1 |
| Carbohydrates | 26.3 |
| Fiber | 0.8 |
| Ash | 1.4 |

The distinctive flavor of garlic is due to an essential or volatile oil. In fresh garlic this amounts to 0.2%. The main constituents of this oil are allyl sulphide and allyl isothicyanate. There is also allyl thiocabimide which has a burning taste and will blister the tongue or skin. This last named is decomposed when water is added as the sulphur is liberated.

It is with this volatile oil that the difficulty of control in cooking of the garlic to obtain the desired product is found. How quickly this oil permeates and penetrates is shown in a test with milch cows. The milk obtained from cows which have been allowed to eat garlic greens has a "garlicky" taste within a few minutes, and in a few hours the milk is impossible to use.

When cows have been allowed to inhale the odors from garlic the same results have been obtained, except that the elapsed time is slightly longer. The reason for this is not satisfactorily explained except for the natural affinity of fats for essential oils. Naturally an oil of such strength which creates an odor in everything it comes in contact with is objectionable from a cooking point of view, and must of necessity be handled with caution and the average cook, especially in the household, will hesitate before using it.

As a matter of fact, the taste and odor of a certain amount of garlic is not objectionable to most people since it will be found that many of the prepared foods now on the market contain garlic to a greater or less degree. To many persons the presence of garlic in many foods is not suspected but if garlic had been left out of the prepared food the absence thereof would be detected very readily since it would not have the full flavor to which they have been accustomed.

Since it is the oil which gives garlic its flavor, and since this oil undergoes no change while it is in the vegetable, the only method that would tend to prevent it changing after leaving the vegetable would be one that closely resembles that found in the raw vegetable. It is intended to approximate this condition by introducing a fixed oil and water. Furthermore by changing the elements or the constituents of the essential oil by the process of distilling together with a fixed oil and water, the essential oil is so mixed and distributed that it can be used in ordinary cooking with good results.

The proper amount of fixed oil must be determined in relation to the essential oil and water. Too much fixed oil causes a disagreeable taste. If too much water is used, the sulphur tends to spread and decomposition takes place.

Inasmuch as it is known that the oils in garlic undergo a change when removed from their natural element and that it takes more or less time to bring this about, it is assumed that when introduced into foods and eaten by humans or animals, the oils present are in a transition state. In the event that garlic oils have gone through this transition state then further action when introduced into foods is stopped and it is absorbed much the same as other foods. Furthermore, if a substance is introduced that would readily absorb any gases that this action causes, then this absorbing substance would pass through the digestive system natural to its elements, giving up the collected gases at a point where it does not come in contact with the respiratory system.

With reference to the garlic juice, it is one of the objects of the invention to provide garlic juice for commercial purposes which will eliminate much labor in its handling, particularly in the making and handling of various meat products and other food products. Garlic juice is particularly adaptable in the making of sausage, in meat pickling, meat curing, meat packing and kindred industries.

With reference to the onion flavor, extract and juice, much of what has been said with reference to the securing of the garlic flavor, extract and juice is applicable to the securing of the onion flavor, extract and juice. The processes which are followed for the one are quite similar to the processes followed for the other, but there is some variation due to the differences in composition of the garlic and the onion.

The average composition of onion is:

| | |
|---|---|
| Water | 78.9 |
| Protein | 1.4 |
| Fat | 0.3 |
| Carbohydrates | 8.9 |
| Fiber | 10.0 |
| Ash | 0.5 |

One of the principal advantages resulting from the practice of the processes described herein is that after eating foods in which the garlic flavor and extract, and the onion flavor and extract have been used, they leave no odor on the breath.

The method of obtaining the garlic flavor or extract hereinbefore referred to, is as follows:

Five pounds of garlic bulbs are weighed out and the outer dry skin of the bulbs is removed. The bulbs are then separated into their smaller bulbs or cloves and all the dry skins, dirt, roots and stems are removed. These small bulbs or cloves are then cut, peeled, chopped and bruised in such a way as to permit intimate contact with the liquids which are thereafter added. The mass of bulbs or cloves so treated is placed in a suitable vessel of five gallon capacity. To this mass, one gallon of vegetable oil, such as corn oil, and one and seven-eighths gallons of raw water is added. An air tight cover, except for an opening at its highest point which leads to a condensation chamber or coil, which chamber or coil is surrounded by a cold water jacket constructed in the usual manner, is then placed upon the five gallon vessel. Heat ranging from 120 degrees to 160 degrees, Fahrenheit, is then applied to the vessel.

After the ingredients in the vessel have become heated a steam, vapor or gas is formed which rises to the condensation chamber or coil surrounded by the cold water jacket, where the steam, vapor or gas is reduced to a liquid form and from which the liquid is drawn off and flows into a suitable container. When this liquid which is drawn off into the container amounts to one gallon, the heat is discontinued and cut off. The remaining contents of the vessel, that is the residue garlic cloves, oil and water, being waste matter, is then taken from the vessel and disposed of in any suitable manner. The liquid thus obtained from the condensation chamber or coil, amounting to one gallon, is now ready for use in the food products.

In case the heat should be left on longer so that the temperature would be above 160 degrees Fahrenheit or if, for example, one and one half gallons of liquid should be allowed to condense in the condensation chamber or coil and be drawn off, the ingredients in the vessel would have a tendency to burn and the liquid would have a burnt taste.

The reason for using the vegetable oil or corn oil in this process is that it appears that the oil has the property of retaining the flavoring elements of the garlic in an inactive state. It has also been found that variations of the amounts of water or corn oil will result in the condensed liquid being too strong or too weak, as the case may be, or that decomposition will take place, or that a disagreeable taste is produced in the foods' flavor.

When this liquid which is the result of the condensation process, is applied to food products whether cooked or raw, the results are the same as the results which are obtained when raw garlic is used in the same foods and has the same distinctive flavor. Foods flavored with this liquid are found to be equally flavored in all portions as the water and oil present carry the liquid to all parts of the food in equal proportions.

In order to produce garlic juice as distinguished from the garlic flavor or extract hereinbefore referred to, the following method is employed:

Three pounds of garlic bulbs are weighed out, the outer dry skin being then removed and the bulbs separated into their smaller bulbs or cloves. All dirt, roots, dry skins and stems are removed. These bulbs are then cut, peeled, chopped and bruised so as to permit intimate contact with the liquid which is to be added. The smaller bulbs or cloves are then placed in a five gallon jar and over this mass one gallon of the garlic flavor or extract, such as has been hereinbefore described, is added. An air tight cover is then placed upon the jar and the whole allowed to stand in a cool temperature, below 60 degrees Fahrenheit, for twenty-four hours. The contents of the jar is thereupon removed and is placed in an ordinary wine press and is subjected to pressure. This pressure on the contents of the jar is just enough to extract the liquid therefrom without carrying over the fiber. The liquid thus obtained is thereupon strained through several thicknesses of cheese cloth and is ready for use.

The amount of liquid or garlic juice which is thus obtained amounts to one gallon. The reason the garlic flavor or extract, secured by the hereinbefore described process is used is, that it acts as a solvent on the garlic bulbs or cloves, yet the flavor or extract itself being saturated with the flavoring elements of garlic, the action of the essential oils contained therein is somewhat retarded. Thus, if only water were used certain elements in the liquid would start decomposition as soon as they came in contact with the water.

The juice thus obtained is found to be of equal strength to the same weight of raw garlic.

The process by which the onion flavor or extract hereinbefore referred to, is obtained is as follows:

Ten pounds of onions are weighed out, and all dirt, dry skins, stems and roots are removed. The onions are then cut or chopped into small pieces so as to permit intimate contact with liquids which are afterwards added. The cut or chopped onions are then placed in a five gallon vessel and one gallon of vegetable oil, preferably corn oil, and one and seven-eighths gallons of raw water are added. An air tight cover is then placed upon the vessel which cover has an opening at its highest point leading to a condensation chamber or coil, which chamber or coil is surrounded by a cold water jacket. Then heat is applied from 120 degrees to 160 degrees Fahrenheit. After the ingredients have become heated a steam, vapor or gas is formed which rises to the condensation chamber or coil, surrounded by the cold water jacket, where the steam, vapor or gas is reduced to a liquid form and from which the liquid is drawn off and flows into a suitable container. When this liquid drawn off into the container amounts to one gallon the heat is discontinued and cut off.

The remaining contents of the vessel, that is, the residue of the onions, oil and water, being waste matter, is then taken from the vessel and disposed of in any suitable manner. The liquid thus obtained from the condensation chamber or coil and amounting to one gallon is now ready for use in the food products.

In case the heat should be left on longer so that the temperature would be above 160 degrees Fahrenheit or if, for example, one and one half gallons of liquid should be allowed to condense in the condensation chamber or coil and be drawn off, the ingredients in the vessel would have a tendency to burn and the liquid would have a burnt taste.

The reason for using the vegetable oil or corn oil in this process is that it appears that the oil has the property of retaining the flavoring elements of the onions in an inactive state. It has also been found that variations of the amounts of water or corn oil will result in the condensed liquid being too strong or too weak, as the case may be, or that decomposition will take place, or that a disagreeable taste is produced in the foods' flavor.

When this liquid which is the result of the condensation process, is applied to food products whether cooked or raw, the results are the same as the results which are obtained when raw onions are used in the same foods and has the same d'stinctive flavor. Foods flavored with this liquid are found to be equally flavored in all portions as the water and oil present carry the liquid to all parts of the food in equal proportions.

In order to produce onion juice the following method is used:

Six pounds of dry onions are weighed out and all dirt, roots, dry skins and stems are removed. The onions are then cut or chopped into small pieces so as to permit intimate contact with the liquid which is added as hereinbefore stated. The onions are then placed in a five gallon jar constructed of suitable materials and one gallon of onion flavor or extract, such as has been hereinbefore described, is added. An air tight cover is then placed on the jar and the whole is allowed to stand in a cool temperature, which is below 60 degrees Fahrenheit, for a period of twenty-four hours. The contents of the jar are then removed and placed in an ordinary wine press and pressure is applied. This pressure which is applied to the contents of the jar is just enough to extract the liquid without carrying over any of the fiber. The liquid is then strained through several thicknesses of cheese cloth and placed in suitable jars, ready for use. The amount of onion juice thus obtained is one gallon. The reason that the onion flavor or extract, which is made according to the process hereinbefore described, is used, is that it is itself saturated with the flavoring elements of onion and it acts as a solvent on the onion and does not absorb as much of the flavoring elements as ordinary water or oil would under the same conditions.

For example, if only water is used the flavoring elements immediately combine with the water and decomposition action takes place. In case the onion juice is extracted by means of the saturated solution the decomposition action is retarded so that the onion juice will remain in a wholesome condition for a period of thirty days.

The onion juice thus obtained is found to be of equal strength to the same weight of raw or dry onions, that is, in some cases where eight pounds of raw dry onions are now used, five pounds of juice will produce the same results, plus a more equal distribution of the juice in the product.

As changes of porportions of the various ingredients used can be made and come within the scope of the invention, it is intended that all matter contained in the above specification should be interpreted as illustrative and not in a limiting sense. For instance more garlic or onion can be used in proportion to the water and oil, or more oil in proportion to the garlic, onion and water, or more water in proportion to the oil, garlic or onion, or one of either, the water or oil may in some instances, be left out completely.

What I claim and desire to secure by Letters Patent is:

1. The herein described method of producing a food flavoring product from bulbs of the group of garlic and onions, which consists in extracting the flavoring elements of the bulbs, by adding corn oil and water to the bulbs, applying heat to the mass, and distilling the same to secure the extract sought.

2. The herein described method of producing a flavor or extract of bulbs of the group of garlic and onions, which consists in preparing a quantity of said bulbs, pouring corn oil over said bulbs, and adding to the mass a larger volume of water than oil, applying heat thereto and securing therefrom a condensed liquid which contains the flavor or extract of said bulbs.

3. The herein described method of producing a flavor or extract from bulbs of the group of garlic and onions, which consists in preparing a predetermined amount of said bulbs for intimate contact with corn oil and water, adding to the bulbs corn oil and water, applying heat thereto at a temperature of from 120 degrees to 160 degrees Fahrenheit, condensing the vapors obtained from the bulbs, corn oil and water, upon said application of heat, the condensation being carried on to the point where the yield of condensate is one gallon.

4. The herein described method of producing a flavor or extract from bulbs of the group of garlic and onions, which consists in preparing a predetermined amount of said bulbs for intimate contact with corn oil and water, adding to the bulbs one gallon of corn oil and one and seven eighths gallons of water, applying heat thereto at a temperature of from 120 degrees to 160 degrees Fahrenheit, condensing the vapors obtained from the bulbs, corn oil and water upon said application of heat, the condensation being carried on to the point where the yield of condensate is one gallon.

5. The herein described method of producing a flavor or extract from bulbs of the group of garlic and onions, which consists in preparing a predetermined amount of said bulbs for intimate contact with corn oil and water, adding to the bulbs approximately one gallon of corn oil and approximately one and seven eighths gallons of water, applying heat thereto at a temperature of from 120 degrees to 160 degrees Fahrenheit, condensing the vapors obtained from the bulbs, corn oil and water, upon said application of heat, the condensation being carried on to the point where the yield of condensate is one gallon.

JOHN B. ROLLE.